US009524308B2

(12) United States Patent
Yarramreddy et al.

(10) Patent No.: US 9,524,308 B2
(45) Date of Patent: Dec. 20, 2016

(54) SYSTEM AND METHOD FOR PROVIDING PLUGGABLE SECURITY IN AN ENTERPRISE CRAWL AND SEARCH FRAMEWORK ENVIRONMENT

(71) Applicant: Oracle International Corporation, Redwood Shores, CA (US)

(72) Inventors: Sandeep Yarramreddy, Fremont, CA (US); DJ Vasant Ursal, Austin, TX (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/733,057

(22) Filed: Jan. 2, 2013

(65) Prior Publication Data
US 2013/0238589 A1   Sep. 12, 2013

Related U.S. Application Data

(60) Provisional application No. 61/609,644, filed on Mar. 12, 2012, provisional application No. 61/609,684, (Continued)

(51) Int. Cl.
*G06F 7/00* (2006.01)
*G06F 17/30* (2006.01)
(Continued)

(52) U.S. Cl.
CPC ..... *G06F 17/30318* (2013.01); *G06F 17/3087* (2013.01); *G06F 17/30289* (2013.01);
(Continued)

(58) Field of Classification Search
CPC .............. G06F 17/30607; G06F 2221/2141; G06F 17/30864
(Continued)

(56) References Cited

U.S. PATENT DOCUMENTS 6,609,123 B1   8/2003   Cazemier
7,523,471 B1   4/2009   Dorn
(Continued)

FOREIGN PATENT DOCUMENTS

EP   2270725   1/2011

*Primary Examiner* — Usmaan Saeed
*Assistant Examiner* — Brian E. Weinrich
(74) *Attorney, Agent, or Firm* — Tucker Ellis LLP (57) ABSTRACT

A system and method are described, wherein the system includes an enterprise crawl and search framework, abstracts an underlying search engine, provides a common set of application programming interfaces for developing search functionalities, and allows the framework to serve as an integration layer between one or more enterprise search engines and one or more enterprise applications. A pluggable security environment which includes one or more enterprise application security APIs, authentication services, security plugin, authorization service, and data service, allows an application developer to add security information to enterprise application data before inserting or creating indexes on the search engine, and deploy the enterprise application and use any policies in its configuration to configure enterprise application domain security, so that at query time, the security environment retrieves security keys of a user performing an enterprise application search, and passes those keys to the search engine for filtering the query results.

22 Claims, 4 Drawing Sheets

Related U.S. Application Data filed on Mar. 12, 2012, provisional application No. 61/609,698, filed on Mar. 12, 2012, provisional application No. 61/621,405, filed on Apr. 6, 2012, provisional application No. 61/659,843, filed on Jun. 14, 2012, provisional application No. 61/659,877, filed on Jun. 14, 2012.

(51) Int. Cl.
  *G06F 21/60* (2013.01)
  *G06F 21/62* (2013.01)
  *H04L 29/06* (2006.01)
  *G06F 15/16* (2006.01)

(52) U.S. Cl.
  CPC .. *G06F 17/30607* (2013.01); *G06F 17/30864* (2013.01); *G06F 21/604* (2013.01); *G06F 21/6227* (2013.01); *G06F 21/6236* (2013.01); *H04L 63/101* (2013.01); *H04L 63/20* (2013.01); *G06F 2221/2119* (2013.01); *G06F 2221/2141* (2013.01)

(58) Field of Classification Search
  USPC .......................................... 707/792, 785, 709
  See application file for complete search history.

(56) References Cited

U.S. PATENT DOCUMENTS

| | | | |
|---|---|---|---|
| 7,689,580 B2 | 3/2010 | Wang et al. | |
| 7,693,897 B2* | 4/2010 | Bugir et al. | 707/792 |
| 7,769,752 B1 | 8/2010 | Turner | |
| 7,966,369 B1 | 6/2011 | Briere | |
| 8,056,091 B2 | 11/2011 | Brunswig | |
| 8,176,083 B2* | 5/2012 | Vossen et al. | 707/796 |
| 8,266,150 B1 | 9/2012 | Lin | |
| 8,621,085 B2* | 12/2013 | Trost et al. | 707/792 |
| 9,280,676 B2 | 3/2016 | Said | |
| 2001/0034733 A1 | 10/2001 | Prompt | |
| 2002/0107957 A1* | 8/2002 | Zargham et al. | 709/224 |
| 2003/0217034 A1 | 11/2003 | Shutt | |
| 2004/0064447 A1 | 4/2004 | Simske | |
| 2005/0027796 A1 | 2/2005 | San Andres | |
| 2005/0149496 A1 | 7/2005 | Mukherjee et al. | |
| 2006/0112130 A1 | 5/2006 | Lowson | |
| 2006/0200556 A1 | 9/2006 | Brave et al. | |
| 2006/0277166 A1* | 12/2006 | Vogler-Ivashchanka et al. | 707/999.003 |
| 2007/0016604 A1 | 1/2007 | Murthy et al. | |
| 2007/0130112 A1 | 6/2007 | Lin | |
| 2007/0130126 A1 | 6/2007 | Lucovsky | |
| 2007/0208744 A1 | 9/2007 | Krishnaprasad et al. | |
| 2007/0226242 A1* | 9/2007 | Wang et al. | 707/999.102 |
| 2007/0266384 A1 | 11/2007 | Labrou | |
| 2007/0277110 A1 | 11/2007 | Rogers | |
| 2008/0082573 A1* | 4/2008 | Fish et al. | 707/999.102 |
| 2008/0114628 A1* | 5/2008 | Johnson et al. | 705/7 |
| 2008/0263462 A1 | 10/2008 | Mayer-Ullmann et al. | |
| 2008/0275844 A1 | 11/2008 | Buzsaki | |
| 2008/0281824 A1* | 11/2008 | Rangadass et al. | 707/999.008 |
| 2008/0301562 A1 | 12/2008 | Berger | |
| 2009/0106207 A1 | 4/2009 | Solheim | |
| 2009/0112844 A1 | 4/2009 | Oro | |
| 2009/0222465 A1 | 9/2009 | Bernard | |
| 2010/0114947 A1 | 5/2010 | Eftekhari | |
| 2010/0205160 A1 | 8/2010 | Kumar | |
| 2010/0319067 A1 | 12/2010 | Mohanty et al. | |
| 2010/0325569 A1 | 12/2010 | King et al. | |
| 2011/0077936 A1 | 3/2011 | Arumugam | |
| 2011/0125764 A1 | 5/2011 | Carmel et al. | |
| 2011/0191312 A1 | 8/2011 | Gutlapelli et al. | |
| 2011/0258199 A1 | 10/2011 | Oliver | |
| 2011/0270820 A1 | 11/2011 | Agarwal | |
| 2012/0259927 A1 | 10/2012 | Lockhart | |
| 2013/0061174 A1 | 3/2013 | Buchanan | |
| 2013/0073536 A1 | 3/2013 | Fedorynski | |
| 2013/0073570 A1 | 3/2013 | Joshi et al. | |

\* cited by examiner

SYSTEM AND METHOD FOR PROVIDING PLUGGABLE SECURITY IN AN ENTERPRISE CRAWL AND SEARCH FRAMEWORK ENVIRONMENT

CLAIM OF PRIORITY

This application claims the benefit of priority to U.S. Provisional Patent Application No. 61/609,644, titled "SYSTEM AND METHOD FOR PROVIDING AN ENTERPRISE CRAWL AND SEARCH FRAMEWORK", filed Mar. 12, 2012; U.S. Provisional Patent Application No. 61/609,684, titled "SYSTEM AND METHOD FOR PROVIDING AN ENTERPRISE CRAWL AND SEARCH FRAMEWORK", filed Mar. 12, 2012; U.S. Provisional Patent Application No. 61/609,698, titled "SYSTEM AND METHOD FOR PROVIDING AN ENTERPRISE CRAWL AND SEARCH FRAMEWORK", filed Mar. 12, 2012; U.S. Provisional Patent Application No. 61/621,405, titled "SYSTEM AND METHOD FOR PROVIDING AN ENTERPRISE CRAWL AND SEARCH FRAMEWORK", filed Apr. 6, 2012; U.S. Provisional Patent Application No. 61/659,843, titled "SYSTEM AND METHOD FOR PROVIDING AN ENTERPRISE CRAWL AND SEARCH FRAMEWORK USER INTERFACE", filed Jun. 14, 2012; and U.S. Provisional Patent Application No. 61/659,877, titled "SYSTEM AND METHOD FOR PROVIDING AN ENTERPRISE CRAWL AND SEARCH FRAMEWORK SECURITY", filed Jun. 14, 2012; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to enterprise applications, and to systems and methods for providing an enterprise crawl and search framework, including features such as use with middleware and enterprise application environments, pluggable security, search development tools, user interfaces, and governance.

BACKGROUND

Enterprise resource planning (ERP) or enterprise applications are commonly used by larger companies and organizations to run important aspects of their business. A typical enterprise application environment may include a database of business content, combined with end-user applications such as customer relationship management (CRM), human capital management (HCM), and business intelligence (BI).

Examples of such environments include Oracle E-Business Suite, and Oracle Fusion Applications, each of which are designed for handling complex business tasks within a large organization.

Organizations have become increasingly interested in greater integration of their business content with their business processes, including the use of transaction processing systems or application servers, such as Oracle WebLogic or Oracle Fusion Middleware, to deliver a higher quality of service in today's increasingly complex business environment. Such organizations can benefit from a richer search experience within their enterprise, which in turn requires rethinking traditional search methodologies. For example, since those company employees seeking particular information are also likely to have the best knowledge regarding their particular situation, it is important that they can obtain the information within that context. These are the general areas that embodiments of the invention are intended to address.

SUMMARY

In accordance with various embodiments, described herein are systems and methods for providing an enterprise crawl and search framework, including features such as use with middleware and enterprise application environments, pluggable security, search development tools, user interfaces, and governance.

As described herein, in accordance with an embodiment, the system includes an enterprise crawl and search framework which abstracts an underlying search engine, provides a common set of application programming interfaces for developing search functionalities, and allows the framework to serve as an integration layer between one or more enterprise search engine and one or more enterprise application. A pluggable security environment which includes one or more enterprise application security APIs, authentication services, security plugin, authorization service, and data service, allows an application developer to add security information to enterprise application data before inserting or creating indexes on the search engine, and deploy the enterprise application and use any policies in its configuration to configure enterprise application domain security, so that at query time, the security environment retrieves security keys of a user performing an enterprise application search, and passes those keys to the search engine, where they are used to filter the query results.

DETAILED DESCRIPTION

As described above, organizations have become increasingly interested in greater integration of their business content with their business processes, including the use of transaction processing systems or application servers, to deliver a higher quality of service in today's increasingly complex business environment.

In particular, today's enterprise search specialists are looking to several important aspects of enterprise searching for use with their systems, including:

Visibility into the search engine process, which requires that the search engine not only log search activity, but also provide on-board reporting of user interaction.

Greater control of the search process, which enables information technology and business analysts to control and bias the search algorithm when necessary, including the use of relevance weightings for particular classes of content, and determining how host repositories should be indexed.

Improved delivery of search solutions to end-users, including the use of flexible templates for quickly building and rebuilding search experiences, and management dashboards that enable administrators to write and test business rules, relevance weighting profiles, and the indexing process.

Scalability in the search engine architecture, including the ability to scale the architecture using low-cost hardware.

Search engine security, including the ability to perform security checks in the search engine at runtime (when a set of results is queried), at index time (while the indexer crawls the data source), and/or upon a user's search query at execution time, to ensure the user see only that to which they are entitled.

To address this, in accordance with an embodiment, described herein are systems and methods for providing an enterprise crawl and search framework (ECSF), including features such as use with middleware and enterprise application environments, pluggable security, search development tools, user interfaces, and governance.

In accordance with an embodiment, the enterprise crawl and search framework can be used with environments such as Oracle Fusion Applications and/or Oracle WebLogic application server, or other enterprise application and computing environments, to consolidate business content information, and enable transactional search in a business context.

In accordance with an embodiment, the enterprise crawl and search framework includes an open architecture that supports different types of search engine in a plug-and-play manner, e.g., the use of Oracle Secure Enterprise Search (SES) or another open source or proprietary search engine. An administrator can add, define, configure and change search engines; define repositories to be supported; and administer external repositories, such as defining their location, defining and configuring connectors, indexing external data, and defining parameters related to federated search.

In accordance with an embodiment, the enterprise crawl and search framework can support features such as searching across different objects that have 1:1, 1:M, M:1 or M:M relationships with each other, as defined by the organization's business process; and the use of searchable objects, which allow users to control which objects can be exposed and made searchable.

In accordance with an embodiment which uses Fusion Applications, the enterprise crawl and search framework can be provided as part of an integrated environment that includes the framework itself; one or more search engines that provides the fundamental search capability that includes indexing, querying, and security; and a source system, such as a relational database, which stores searchable business content or other information.

In accordance with various embodiments described herein, some of the features and advantages of the enterprise crawl and search framework include:

Transparent integration of enterprise applications (e.g., Fusion Applications) with search engines, which minimizes development time and maximizes the user experience with search.

Code reuse, through the use of a well designed set of abstract classes, to reduce long design cycles.

Basic platform for developing search, which helps developers to grasp the conceptual flow of work easily.

Centralized process and control mechanism, which enhances search functionality.

Basic search functionality, which allows querying based on keyword and search categories.

Advanced search functionality, which allows querying based on keyword, search category, and attribute filters.

Faceted navigation, which allows filtering of search results based on attributes of business objects. For example, users can navigate a search result set based on a set of predefined facets, or dimensions; the system returns a list of facets and their associated set of available values with the search result; users can select a value for each facet, which is then submitted with the search query in order to narrow down the result set.

Actionable results, which are search results with action links associated with the searchable objects. From the search results, users can either go straight to the page displaying the record they selected, or they can invoke a specific task on a search result.

Saved searches, which allows saved search criteria for later use. Users can create new saved search entries, edit and delete existing saved search entries, and retrieve user-specified or public saved search entries.

File attachments, which allow the crawling of attachments associated with transactional objects or records, such as Fusion Applications transactional objects or records.

Crawling of searchable objects that contain appropriate tags.

Crawling of tree structures, which supports search functionality on those source systems which contain data organized in a tree structure (e.g., Oracle Business Intelligence).

Search support for external data sources, which allows querying against search groups that contain non-framework data sources, such as wiki pages and blogs, and which can be directly crawled by the search engine.

ECSF Architecture

Figure 1:
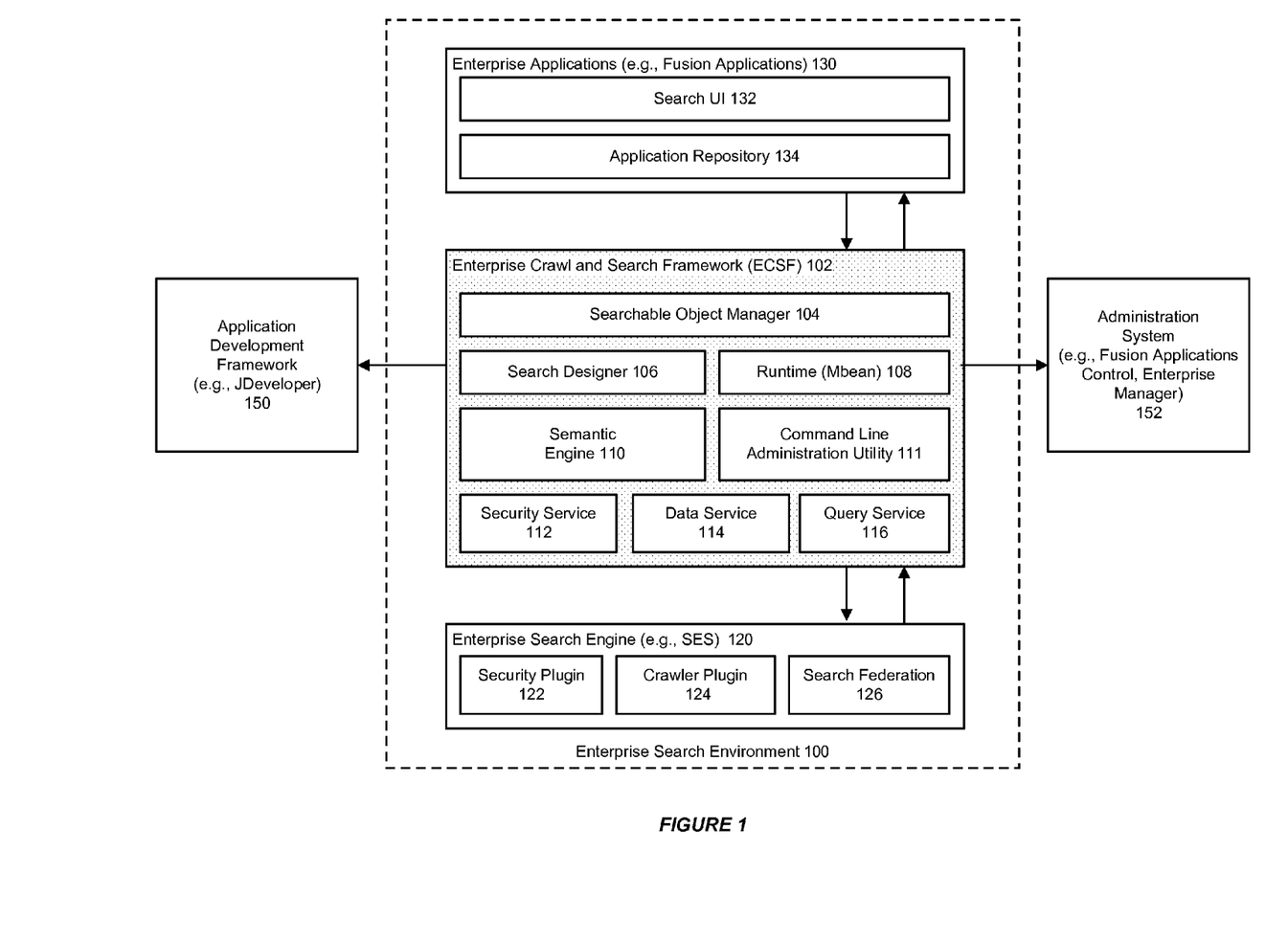
FIG. 1 illustrates an enterprise search environment including an enterprise crawl and search framework, in accordance with an embodiment.

FIG. 1 illustrates an enterprise search environment 100 including an enterprise crawl and search framework 102, in accordance with an embodiment. As shown in FIG. 1, in accordance with an embodiment, the framework abstracts an underlying search engine, and provides a common set of application programming interfaces (APIs) for developing search functionalities, which allows the framework to serve as an integration layer between one or more enterprise search engines 120 (e.g., SES), and one or more enterprise applications 130 (e.g., Fusion Applications).

In accordance with an embodiment, the enterprise crawl and search framework includes a searchable object manager component 104, a search designer component 106, a runtime (e.g., managed bean, Mbean) component 108, a semantic engine component 110, a command line administration utility component 111, and one or more security services, e.g., 112, data service 114, and query service 116. Each of the above components is described in further detail below.

In accordance with an embodiment, the enterprise crawl and search framework integrates with an enterprise search engine (e.g., SES), which provides capabilities for crawling and indexing metadata and objects exposed by the framework. In accordance with an embodiment, the enterprise search engine can include one or more security plugin components, e.g., 122, crawler plugin component 124, and search federation component 126. Each of the above components is also described in further detail below.

In accordance with an embodiment, each enterprise application can include a search user interface (UI) 132, and an application repository 134.

In accordance with an embodiment, the enterprise search environment including the enterprise crawl and search framework can be accessed by a developer or another user using an application development framework 150 (e.g., Oracle JDeveloper); and by an administrator or another user using an administration system 152 (e.g., Oracle Fusion Applications Control, or Oracle Enterprise Manager).

Searchable Object Manager

In accordance with an embodiment, the searchable object manager component serves as a metadata manager, manages searchable objects, and provides the runtime interface for accessing these objects. At runtime, the searchable object manager loads searchable objects from persistent storage, validates the searchable object definitions, and provides the searchable objects to a crawlable factory component of the data service. In accordance with an embodiment, the searchable object manager is also responsible for the lifecycle management of the searchable objects, which allows administrators to deploy, customize, and enable or disable searchable objects via the command line administration utility component, or the administration system.

Search Designer

In accordance with an embodiment, the search designer component can be provided, e.g., as a page in JDeveloper, including an interface for defining metadata that describes the business objects to be indexed. A developer or another user can use this design interface to specify the security mechanism to be used to protect the data, and to define the searchable object search characteristics, which include advanced search, faceted navigation, and actionable results.

Semantic Engine

In accordance with an embodiment, the semantic engine component leverages the semantic information of searchable object definitions to create context around the search, by interpreting searchable object definitions with relation to the runtime user information during both crawl and query time.

Administration System

In accordance with an embodiment, the administration system can be provided, e.g., as an Enterprise Manager extension that provides a user interface for registering searchable objects in the framework schema of, e.g., the Fusion Applications database, as well as for administering the runtime parameters of the framework, the target search engine, and the configuration of parameters.

Command Line Administration Utility

In accordance with an embodiment, the command line administration utility component is a standalone command line interface that provides a user interface for registering searchable objects in the framework schema of, e.g., the Fusion Applications database. A developer, administrator, or other user can also use the command line administration utility to configure and administer the framework without external dependencies on the administration system.

Security Service

In accordance with an embodiment, the security service component is responsible for providing security information to the search engine. During query time, the security service retrieves the security keys of the user performing the search, and passes those keys to the search engine, where they are used to filter the query results.

In accordance with an embodiment, the security service server component is also invoked during crawl time, to add security information (access control lists, ACL) to data before inserting or creating indexes on the search engine. An ACL identifies the users who can access an associated object, and specifies the user's access rights to that object. The ACL values generated by the security service during crawl time should match the corresponding keys generated during query time.

In accordance with an embodiment, the security service component is implemented as a security engine with a plug-in interface. The security plug-in determines the format of the ACL keys. For custom security models, a new/custom security plug-in can be implemented. In accordance with an embodiment, the security service can use, e.g., Oracle Platform Security for Java, to authenticate users and call the security plug-in to retrieve security values for a given searchable object.

Data Service

In accordance with an embodiment, the data service component is the primary data interface between the enterprise crawl and search framework and the search engine. In accordance with an embodiment, the data service can use a proprietary Really Simple Syndication (RSS) feed format. In addition to supporting the flow of metadata between the framework and the search engine, the data service can support attachments, batching, and error handling.

In accordance with an embodiment, the data service authenticates each search engine crawl request by using, e.g., Platform Security for Java, to validate the user credentials and permissions for crawling the data source. A crawlable factory component, which is part of the data service, determines how searchable objects are broken down, and manages the construction of RSS feeds to the search engine.

Query Service

In accordance with an embodiment, the query service component provides a search interface for the enterprise application's search user interface (UI), and handles all search requests. In accordance with an embodiment, the query service performs query rewrite, parameter substitution, and other preprocessing operations, before invoking the underlying configured search engine. Search results are also serviced via this service. Hooks can be provided to preprocess and postprocess data, which facilitates the capability to filter search results.

Search Engine

In accordance with an embodiment, the search engine component (e.g., SES) enables a secure, uniform search across multiple enterprise repositories. The enterprise crawl and search framework integrates with the search engine to provide full-text search functionality in enterprise applications (e.g., Fusion Applications).

Security Plug-in

Some search engines, such as SES, provide an API for writing security plug-ins or connectors, e.g., in Java, which allows a developer to provide a security plug-in to meet their requirements. In accordance with an embodiment, the enterprise crawl and search framework can interface with this security plug-in. The security plug-in invokes the security service to retrieve keys, to which the user has access, for filtering the results that are delivered to the query service. In accordance with an embodiment, a proxy user must be set up on the search engine in order to invoke the security service, and must have security privileges for the enterprise applications (e.g., Fusion Applications).

Crawler Plug-in

In accordance with an embodiment, the crawler plug-in component is a search engine module that implements the modified RSS feed format between the enterprise crawl and search framework and the search engine. In accordance with an embodiment, the crawler plug-in component deserializes data communicated by the framework, via the data service component, and interfaces with the search engine components that create the indexes.

Search Federation

In accordance with an embodiment, the search federation component provides support for the user of federated search engine instances.

Figure 2:
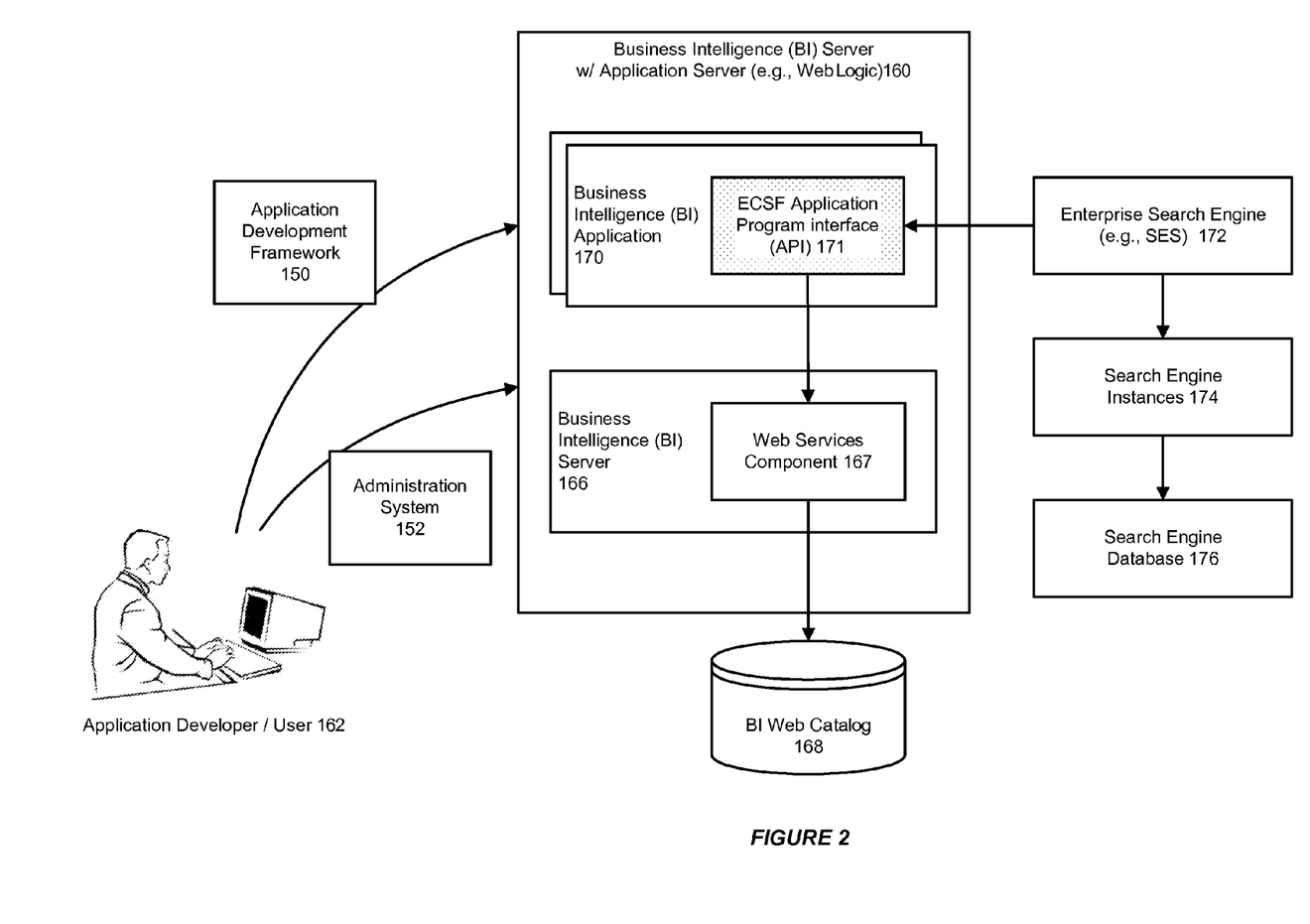
FIG. 2 illustrates an enterprise resource planning or enterprise application environment which includes an enterprise crawl and search framework, in accordance with an embodiment.

FIG. 2 illustrates an enterprise resource planning or enterprise application environment which includes an enterprise crawl and search framework, in accordance with an embodiment. It will be evident that the environment illustrated in FIG. 2 is provided merely as an illustrative example of the type of environment that can utilize various embodiments of the invention, and that, in accordance with other embodiments, different environments can be used.

As shown in FIG. 2, in accordance with an embodiment, a business intelligence (BI) server environment 160, such as an Oracle Business Intelligence environment using WebLogic application server, can include a BI server 166, and a web services component 167, that provides access to a BI web catalog of business content, data, or other information 172.

In accordance with an embodiment, one or more BI applications 170 can include an enterprise crawl and search framework API 171, which allows a developer or other user 162 using an application development framework and/or administration system, to configure the BI application(s) to take advantage of the enterprise crawl and search framework, including leveraging the enterprise search engine 172, search instances 174, and search engine database 176, to provide full-text search functionality across the applications.

Pluggable Security

In accordance with an embodiment, a system including the enterprise crawl and search framework can include support for pluggable security.

As described above, in accordance with an embodiment, during query time, the security service retrieves the security keys of the user performing the search, and passes those keys to the search engine, where they are used to filter the query results. During crawl time, the security service adds security information (access control lists, ACL) to data before inserting or creating indexes on the search engine. An ACL identifies the users who can access an associated object, and specifies the user's access rights to that object. The ACL values generated by the security service during crawl time should match the corresponding keys generated during query time.

In accordance with an embodiment, a security plug-in determines the format of the ACL keys. For custom security models, a new/custom security plug-in can be implemented. Some search engines, such as SES, provide an API for writing security plug-ins or connectors, e.g., in Java, which allows a developer to provide a security plug-in to meet their requirements. In accordance with an embodiment, the enterprise crawl and search framework can interface with this security plug-in. When alternative types of search engine are used, alternative plug-ins, connectors, or means of communicating with the search engine can be used, depending on the particular requirements and features of the search engine.

Figure 3:
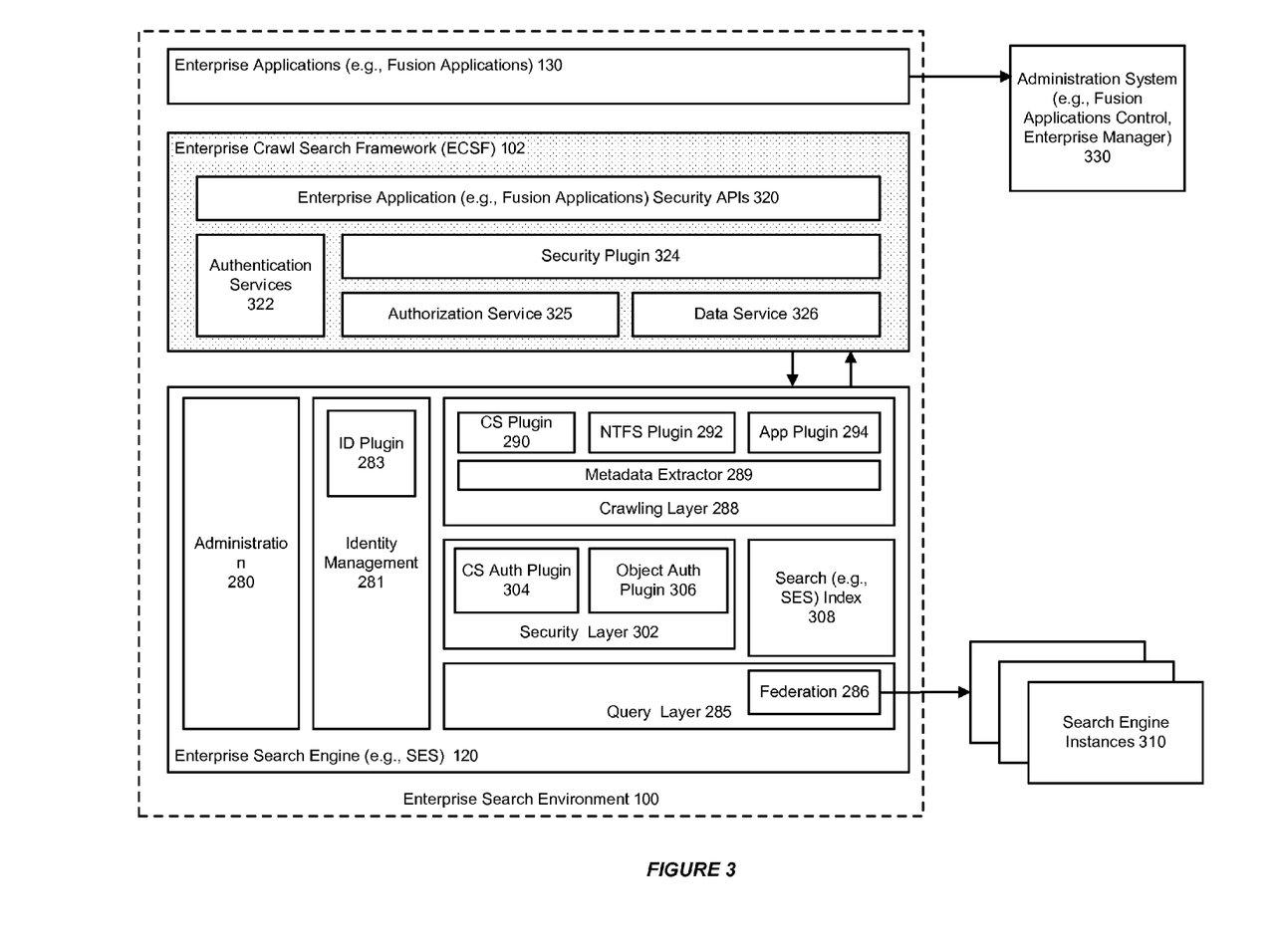
FIG. 3 illustrates a pluggable security environment, for use with an enterprise crawl and search framework, in accordance with an embodiment.

FIG. 3 illustrates a pluggable security environment, for use with an enterprise crawl and search framework, in accordance with an embodiment. In accordance with an embodiment, the pluggable security environment converts enterprise application entitlements to security engine access control lists, for use in responding to user queries.

As shown in FIG. 3, in accordance with an embodiment, the enterprise search engine (e.g., SES) can include one or more administration component 280, identity management component 281 with ID plugin 283, crawling layer 288 including metadata extractor 289, CS plugin 290, NTFS plugin 292 and application plugin 294, security layer 302 including CS authentication plugin 304 and object authentication plugin 306, search (e.g., SES) index 308, and query layer 285 with a federation component 286 that provides access to one or more search engine instances 310.

As further shown in FIG. 3, in accordance with an embodiment, the enterprise crawl and search framework (ECSF) can include one or more Enterprise Application (e.g., Fusion Applications) security APIs 320, authentication services 322, security plugin 324, authorization service 325, and data service 326.

In accordance with an embodiment, the enterprise crawl and search framework security can be configured by a user using an administration system 330 (e.g., Fusion Applications Control, or Enterprise Manager).

In accordance with an embodiment, the search engine does not apply data level security to business objects that are exposed as searchable objects, to determine if a particular object can be viewed by the user. Instead, the system is configured so that all qualified users will see a limited amount of information when the business object is enabled for search. In accordance with an embodiment, the information displayed in the search results (e.g., the search box or user interface) includes the item number and description. The enterprise crawl and search framework checks the data level security whenever the user elects to view item details, by following through the links within their search results.

In accordance with an embodiment, the pluggable security environment can be used to secure credentials and searchable application data. The credentials are required for the enterprise crawl and search framework engine to be able to communicate with the enterprise search engine's administration service, query service, and security service. In accordance with an embodiment, the enterprise crawl and search framework also uses Secure Socket Layer (SSL) to secure the connections through which the credentials are transmitted.

In accordance with an embodiment, the enterprise crawl and search framework can store credentials and passwords in, e.g. a Credential Store Framework (CSF) component of a WebLogic domain. These passwords can then be used to perform secure interaction between the enterprise crawl and search framework engine and the enterprise search engine.

In accordance with an embodiment, when the enterprise crawl and search framework runtime server or client library is added to, e.g., an enterprise application project in JDeveloper, a permission policy can be added to an identity management (ID) store for that enterprise application (e.g., in the contact of Fusion Applications, the jazn-data.xml file), for example:

```xml
<grant>
    <grantee>
        <codesource>
        <url>file:${domain.home}/servers/${weblogic.Name}/tmp/
            _WL_user/oracle.ecsf/-</url>
        </codesource>
    </grantee>
    <permissions>
        <permission>
        <class>oracle.security.jps.service.credstore.
            CredentialAccessPermission</class>
        <name>context=SYSTEM,mapName=oracle.ecsf,keyName=*</name>
        <actions>*</actions>
        </permission>
        <permission>
        <class>oracle.security.jps.JpsPermission</class>
        <name>IdentityAssertion</name>
        <actions>execute</actions>
        </permission>
    </permissions>
</grant>
```

When the enterprise application is subsequently deployed, the policies in the identity management store for that enterprise application can then be used to configure the enterprise application domain security (e.g., the WebLogic domain).

For example, in accordance with an embodiment, Fusion Applications include six search-related application identities that are seeded and are stored in the identity store: FUSION_APPS_CRM_SES_CRAWL_APPID; FUSION_APPS_FSCM_SES_CRAWL_APPID; FUSION_APPS_HCM_SES_CRAWL_APPID; FUSION_APPS_CRM_ECSF_SEARCH_APPID; FUSION_APPS_FSCM_ECSF_SEARCH_APPID; FUSION_APPS_HCM_ECSF_SEARCH_APPID; and FUSION_APPS_ECSF_SES_ADMIN_APPID.

In accordance with an embodiment, each pair of application identities, including one pair for each product family, are used to integrate the enterprise crawl and search framework with the enterprise application (in this example, Fusion Applications). In accordance with an embodiment, the Credential Store Framework (CSF) component of the WebLogic domain can be used to store the credentials to access the identities.

If the enterprise application developer is developing applications on, e.g., an Integrated WebLogic Server instance, then in accordance with an embodiment they must manually configure the application identities to integrate the enterprise crawl and search framework for the crawl users: SES_ADMIN_USERNAME, SES_QUERY_PROXY_USERNAME, and ECSF_SECURITY_USERNAME.

The required setup for any particular user depends on the application setup, and is not controlled by the enterprise crawl and search framework. For example, Fusion Applications includes three application IDs that are created for use in crawling data: FUSION_APPS_CRM_SES_CRAWL_APPID, FUSION_APPS_FSCM_SES_CRAWL_APPID, and FUSION_APPS_HCM_SES_CRAWL_APPID. In accordance with an embodiment, the enterprise application developer must make sure that the proper roles, permissions, and privileges are granted to these three application IDs, so they have access to the data to be crawled.

In the example of a Fusion Applications environment, to configure the application identities, the enterprise application developer must also: ensure the SearchContext is set to FusionSearchContextlmpl; create the application identities; and ensure the permission policies for the identity store and the JPS IdentityAssertion API are added to the identity management store for that enterprise application (e.g., in the context of Fusion Applications, the jazn-data.xml file).

In order for the enterprise crawl and search framework to handle the application identities of, e.g., Fusion applications, the SearchContext must be set to FusionSearchContextlmpl. The SearchContext is automatically set at runtime based on the runtime environment. If the SearchContext is not set properly, then the developer can set the context using an oracle.ecsf.context system property.

For example, the developer can set the user names for Customer Relationship Management to: SES_ADMIN_USERNAME=eqsys; SES_QUERY_PROXY_USERNAME=FUSION_APPS_CRM_ECSF_SEARCH_APPID; and ECSF_SECURITY_USERNAME=FUSION_APPS_CRM_SES_CRAWL_APPID.

Once the user names are set, the developer can update the corresponding password parameters for those users to the key names for the application identities. This creates entries with the correct map/key pairs for the users.

For a Fusion Applications environment, in accordance with an embodiment, in order for the enterprise crawl and search framework to read and write to the application identity maps in the keystore, and access the JPS IdentityAssertion API, permissions must be granted to the crawl users. In the context of Fusion applications, the permission policies are seeded in the identity management store for the enterprise application (e.g., the jazn-data.xml file) and can be managed in, e.g., Fusion Applications Control, for example by specifying:

```xml
<grant>
    <grantee>
        <codesource>
        <url>file:${domain.home}/servers/${weblogic.Name}/tmp/
            _WL_user/oracle.ecsf/-</url>
        </codesource>
    </grantee>
```

-continued

```
<permissions>
    <permission>
    <class>oracle.security.jps.service.credstore.
        CredentialAccessPermission</class>
    <name>context=SYSTEM,mapName=oracle.ecsf,keyName=*</name>
    <actions>*</actions>
    </permission>
<permission>
<class>oracle.security.jps.service.credstore.
        CredentialAccessPermission</class>
    <name>context=SYSTEM,mapName=oracle.wsm.security,
        keyName=FUSION_APPS_FSCM_ECSF_SEARCH_APPID-KEY</name>
    <actions>*</actions>
    </permission>
                (Additional/similar configuration information
                can be specified for other identities, e.g.,
            keyName=FUSION_APPS_HCM_ECSF_SEARCH_APPID-KEY;
            keyName=FUSION_APPS_CRM_ECSF_SEARCH_APPID-KEY;
        keyName=FUSION_APPS_CRM_SES_CRAWL_APPID-KEY, etc)
</permissions>
</grant>
```

The permissions allow the enterprise crawl and search framework to read and write credential store entries. New grants are needed in order to authorize users for the search feeds, which can be provided by manually update the application's jazn-data.xml file:

```
<permission>
    <class>oracle.adf.share.security.authorization.
        MethodPermission</class>
    <name>ECSF_All_Services</name>
    <actions>execute</actions>
</permission>
<grant>
    <grantee>
        <principals>
        <principal>
            <class>oracle.security.jps.service.policystore.
                ApplicationRole</class>
            <name>AuthorizedUserRole</name>
        </principal>
        </principals>
    </grantee>
    <permissions>
        <permission>
            <class>oracle.adf.share.security.authorization.
                MethodPermission</class>
            <name>ECSF_All_Services</name>
            <actions>execute</actions>
        </permission>
    </permissions>
</grant>
```

The above examples illustrate how the jazn-data.xml file can be modified to grant the permission to a role. In accordance with an embodiment, the enterprise crawl and search framework secures the searchable application data by authenticating and authorizing users who use ECSF to perform searches, and enabling the use of the security model for authenticating and authorizing users. To enable the use of the security model, the developer can:

Create users in, e.g. WebLogic; the user credentials are stored in WebLogic and can be used for authentication and authorization to query the enterprise search engine (e.g., SES).

Create a separate user, and add it to the Operators group in order to assign that user the security role of Operator to obtain execute privileges on ECSF MBean operations.

Create an ECSF query proxy user.

Set the search engine instance parameters SES_QUERY_PROXY_USERNAME, and SES_QUERY_PROXY_PASSWORD.

Figure 4:
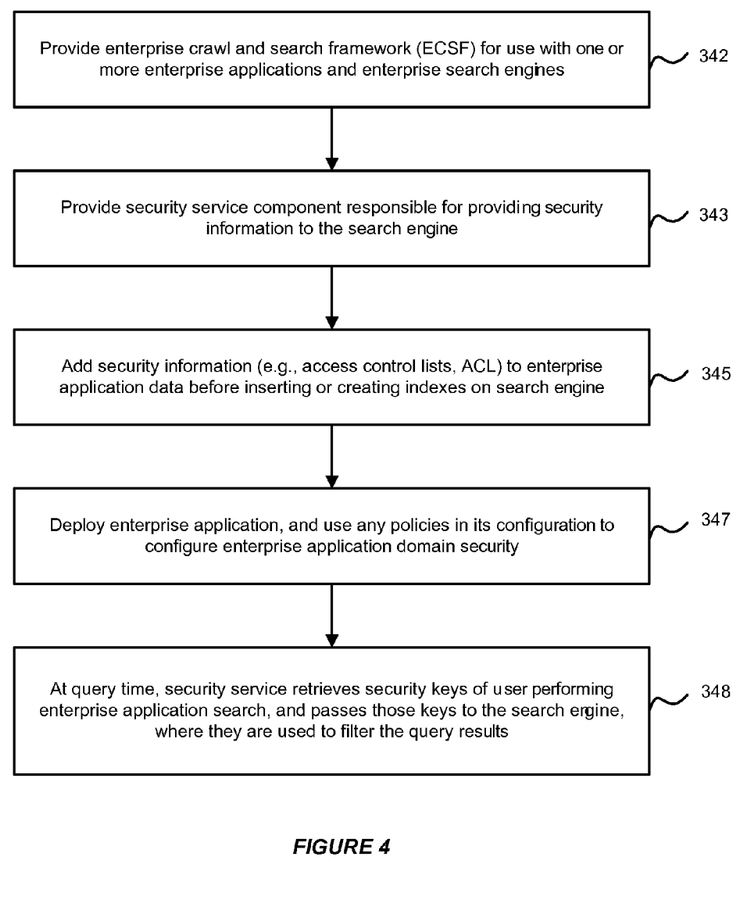
FIG. 4 illustrates a method of providing a pluggable security environment, for use with an enterprise crawl and search framework, in accordance with an embodiment.

FIG. 4 illustrates a method of providing a pluggable security environment, for use with an enterprise crawl and search framework, in accordance with an embodiment. As shown in FIG. 4, in accordance with an embodiment, at step 342, an enterprise crawl and search framework (ECSF) is provided for use with one or more enterprise applications and enterprise search engines.

At step 343, a security service component is provided, which is responsible for providing security information to the search engine.

At step 345, a developer or other user adds security information (e.g., access control lists, ACL) to the enterprise application data, before inserting or creating indexes on search engine.

At step 347, the enterprise application is deployed, and uses any policies in its configuration to configure enterprise application domain security.

At step 348, at query time, the security service retrieves security keys of user performing enterprise application search, and passes those keys to the search engine, where they are used to filter the query results.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

In particular, it will be evident that, although many of the examples described above illustrate the use of an enterprise crawl and search framework within an environment that includes an Oracle Fusion Applications enterprise application, and an Oracle Secure Enterprise Search enterprise search engine, in accordance with various embodiments, the enterprise crawl and search framework, and features and methods described can be used with other types of enterprise application, and other types of enterprise search engine.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for providing a security environment in an enterprise crawl and search framework (ECSF), comprising:
   a computer including one or more microprocessors;
   an ECSF framework, operating on the computer, which abstracts a search engine, provides a common set of application programming interfaces (APIs) for developing search functionalities, and serves as an integration layer between the search engine and an enterprise application deployed in an application server domain;
   a credential store in the application server domain, wherein the credential store stores security credentials for use by the ECSF framework in accessing a plurality of identifiers of the enterprise applications to integrate the enterprise application into the ECSF framework, and for use by the ECSF framework in communicating with the search engine; and
   a security environment, plugged into the ECSF framework, wherein the security environment includes a security service, and a security plug-in;
   wherein the security environment operates to
      add security information to data associated with the enterprise application before inserting or creating indexes on the search engine, wherein the security information identifies users configured to access the enterprise application data and specifies the access rights of the users to the enterprise application data,
      use policies in a configuration of the enterprise application to configure security of the application server domain,
      retrieve at query time, via the security service in response to an invocation by the security plug-in, security keys of a user performing an enterprise application search, wherein the security plug-in determines a particular format for the retrieved security keys,
      pass the retrieved security keys to the search engine, and
      filter query results for the user based on a match between the security keys and the security information added to the enterprise application data.

2. The system of claim 1, wherein the security service is invoked during crawl time to add the security information to the enterprise application data.

3. The system of claim 2, wherein the security information added to the enterprise application data includes access control lists.

4. The system of claim 2, wherein the security service is implemented as a security engine with a plug-in interface.

5. The system of claim 1, wherein the search engine is an Oracle Secure Enterprise Search engine, and wherein the enterprise application is an Oracle Fusion application.

6. The system of claim 1, wherein the enterprise application data includes searchable objects, which are loaded from a persistent storage and validated with regard to their definitions.

7. The system of claim 6, wherein the search engine includes a module that implements a modified Really Simple Syndication (RSS) format, wherein the module deserializes data communicated by the ECSF framework, and interfaces with search engine components that create the indexes.

8. The system of claim 1, wherein the security environment further includes one or more security components selected from the group consisting of an enterprise application security APIs component, an authentication services component, a security plugin component, an authorization service component, and a data service component.

9. The system of claim 1, wherein the security plug-in uses a proxy user to invoke the security service to retrieve the security keys of the user, wherein the proxy server is set up on the search engine, and has security privileges for the enterprise application.

10. The system of claim 9, wherein the security plug-in is written using an application programming interface (API) provided by the search engine.

11. A method for use with an enterprise crawl and search framework (ECSF), for providing support for pluggable security, comprising:
   providing an ECSF framework, operating on a computer including one or more microprocessors, which abstracts a search engine, provides a common set of application programming interfaces (APIs) for developing search functionalities, and serves as an integration layer between the search engine and an enterprise application deployed in an application server domain;
   providing a credential store in the application server domain, wherein the credential store stores security credentials for use by the ECSF framework in accessing a plurality of identifiers of the enterprise applications to integrate the enterprise application into the ECSF framework, and for use by the ECSF framework in communicating with the search engine; and
   plugging a security environment into the ECSF framework, wherein the security environment includes a security service, and a security plug-in;
   adding security information to data associated with the enterprise application before inserting or creating indexes on the search engine, wherein the security information identifies users configured to access the enterprise application data and specifies the access rights of the users to the enterprise application data;
   using policies in a configuration of the enterprise application to configure security of the application server domain;
   retrieving at query time, via the security service in response to an invocation by the security plug-in, security keys of a user performing an enterprise application search, wherein the security plug-in determines a particular format of the retrieved security keys;
   passing the retrieved security keys to the search engine; and filtering query results for the user based on a match between the security keys and the security information added to the enterprise application data.

12. The method of claim 11, wherein the security service is invoked during crawl time to add the security information to the enterprise application data.

13. The method of claim 12, wherein the security information added to the enterprise application data includes access control lists.

14. The method of claim 12, wherein the security service is implemented as a security engine with a plug-in interface.

15. The method of claim 11, wherein the search engine is an Oracle Secure Enterprise Search engine, and wherein the enterprise application is an Oracle Fusion application.

16. The method of claim 11, wherein the enterprise application data includes searchable objects, which are loaded from a persistent storage and validated with regard to their definitions.

17. The method of claim 16, wherein the search engine includes a module that implements a modified Really Simple Syndication (RSS) format, wherein the module deserializes data communicated by the ECSF framework, and interfaces with search engine components that create the indexes.

18. The method of claim 11, wherein the security environment further includes one or more security components selected from the group consisting of an enterprise application security APIs component, an authentication services component, a security plugin component, an authorization service component, and a data service component.

19. The non-transitory computer readable storage medium including instructions stored thereon which, when executed by a computer, cause the computer to perform the steps comprising:

configuring an ECSF framework, operating on the computer, which abstracts a search engine, provides a common set of application programming interfaces (APIs) for developing search functionalities, and serves as an integration layer between the search engine and an enterprise application deployed in an application server domain;

providing a credential store in the application server domain, wherein the credential store stores security credentials for use by the ECSF framework in accessing a plurality of identifiers of the enterprise applications to integrate the enterprise application into the ECSF framework, and for use by the ECSF framework in communicating with the search engine; and plugging a security environment into the ECSF framework, wherein the security environment includes a security service, and a security plug-in;

adding security information to data associated with the enterprise application before inserting or creating indexes on the search engine, wherein the security information identifies users configured to access the enterprise application data and specifies the access rights of the users to the enterprise application data;

using policies in a configuration of the enterprise application to configure security of the application server domain;

retrieving at query time, via the security service in response to an invocation by the security plug-in, security keys of a user performing an enterprise application search, wherein the security plug-in determines a particular format of the retrieved security keys;

passing the retrieved security keys to the search engine; and filtering query results for the user based on a match between the security keys and the security information added to the enterprise application data.

20. The non-transitory computer readable storage medium of claim 19, wherein the security service is invoked during crawl time to add the security information to the enterprise application data.

21. The non-transitory computer readable storage medium of claim 20, wherein the security information added to the enterprise application data includes access control lists.

22. The non-transitory computer readable storage medium of claim 19, wherein the security environment further includes one or more security components selected from the group consisting of an enterprise application security APIs component, an authentication services component, a security plugin component, an authorization service component, and a data service component.

* * * * *

UNITED STATES PATENT AND TRADEMARK OFFICE
CERTIFICATE OF CORRECTION

PATENT NO. : 9,524,308 B2
APPLICATION NO. : 13/733057
DATED : December 20, 2016
INVENTOR(S) : Yarramreddy et al.

It is certified that error appears in the above-identified patent and that said Letters Patent is hereby corrected as shown below:

In the Specification

In Column 6, Line 4, before "component" delete "server".

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*